J. MICHALES & R. J. COMBS.
*Impt in Brushes.*
No. 122,186.                                      Patented Dec. 26, 1871.
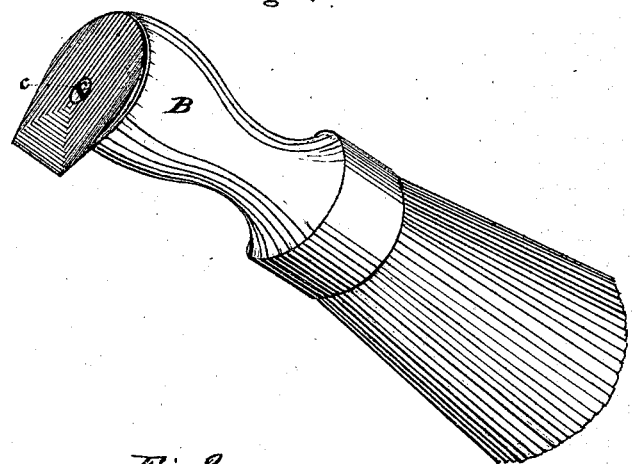
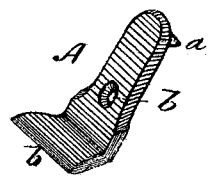
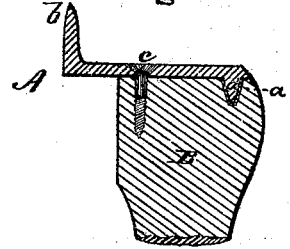
Witnesses.
Harry King.
Phil. T. Dodge
Inventor.
J. Michales
R. J. Combs
by Dodge & Munn
their Atty's

UNITED STATES PATENT OFFICE.

JAMES MICHALES, JR., AND RICHARD JAQUES COMBS, OF BERGEN, N. J.

IMPROVEMENT IN BRUSHES.

Specification forming part of Letters Patent No. 122,186, dated December 26, 1871; antedated December 23, 1871.

*To all whom it may concern:*

Be it known that we, JAMES MICHALES, Jr., and RICHARD JAQUES COMBS, of Bergen, in the county of Hudson and State of New Jersey, have invented certain Improvements in Brushes, of which the following is a specification, reference being had to the accompanying drawing.

When using cleaning or scrubbing brushes it frequently happens that a scraper is required in connection therewith, for the purpose of removing adhering particles or substances from the surface which is being cleaned; and to provide a cheap, rigid, and convenient scraper on the brush, so as to be always at hand, is the object of our invention. Our scraper consists merely of a metal plate, of suitable form to fit the end or side of the brush-body or handle, with a lug to fit into the same and a hole to receive a fastening-screw.

Figure 1 represents a perspective view of a brush, having a round handle or body, with a flat scraper applied to the end thereof. Fig. 2 represents a perspective view of another form of scraper detached. Fig. 3 is a cross-section of the same in position, and Fig. 4 is an edge view of the scraper shown in Fig. 1.

Our scraper A we construct in either the form shown in Figs. 1 and 4, or that shown in Figs. 2 and 3, as desired. The former consists merely of a thin metal plate made flat on one side, and provided with a stud, $a$, on the flat side, and with a hole, $b$, as shown in Fig. 4.

In applying this scraper we flatten the end of the brush-body or handle B, place the plate A against the same so that one edge projects over the side, and then drive down the plate so that the stud enters the handle, and insert a screw, $c$, through hole $b$ into the handle so as to hold the plate in place, as shown in Fig. 1. When thus applied the scraper is held securely and rigidly in place so that it cannot get loose.

When it is required to use the scraper it is only necessary to reverse the brush in the hand, when the brush-handle or body serves as a handle for the scraper, which may be readily and conveniently manipulated.

If it is desired to have the edge of the scraper stand in a different position, it may be turned upward in the form of a lip, as shown in Figs. 2 and 3, the plate being in other respects the same as that shown in Figs. 1 and 4.

We are aware that scrapers have been heretofore applied to brushes, a patent having been granted to R. J. COMBS, one of the parties to this application, for a pivoted folding scraper, on the 11th of October, 1870. The folding scraper was, however, expensive and very frail, being frequently broken or detached by use. All of these objections are obviated, however, by our present plan, and a durable and convenient scraper produced.

Having thus described our invention, what we claim is—

As a new article of manufacture, a brush, B, with scraper A, provided with lug $a$ attached thereto, as and for the purpose set forth.

JAMES MICHALES, JR.
RICHARD JAQUES COMBS.

Witnesses:
WM. H. MICHALES,
MATTHEW BRADLEY.

(22)